United States Patent
Liu et al.

(10) Patent No.: US 7,369,778 B2
(45) Date of Patent: May 6, 2008

(54) DISPERSION COMPENSATION METHOD AND APPARATUS

(75) Inventors: Xiang Liu, Marlboro, NJ (US); Linn Frederick Mollenauer, Colts Neck, NJ (US); Xing Wei, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 771 days.

(21) Appl. No.: 10/331,299

(22) Filed: Dec. 30, 2002

(65) Prior Publication Data

US 2004/0126114 A1 Jul. 1, 2004

(51) Int. Cl.
*H04B 10/12* (2006.01)
*H04B 10/00* (2006.01)

(52) U.S. Cl. ...................................... 398/148; 398/159
(58) Field of Classification Search ................ 398/147, 398/81, 158, 159, 148, 161; 359/337.5
See application file for complete search history.

(56) References Cited

U.S. PATENT DOCUMENTS

| | | | | |
|---|---|---|---|---|
| 5,642,215 | A * | 6/1997 | Suzuki et al. | 398/147 |
| 5,986,789 | A * | 11/1999 | Kawai et al. | 398/147 |
| 6,011,638 | A * | 1/2000 | Mamyshev et al. | 398/147 |
| 6,275,315 | B1 * | 8/2001 | Park et al. | 398/148 |
| 6,381,069 | B1 | 4/2002 | Riant et al. | 359/569 |
| 6,626,591 | B1 * | 9/2003 | Bellotti et al. | 398/79 |
| 2003/0007216 | A1 * | 1/2003 | Chraplyvy et al. | 359/161 |
| 2003/0007217 | A1 * | 1/2003 | Fuerst et al. | 359/161 |
| 2003/0063349 | A1 * | 4/2003 | Peeters et al. | 359/161 |
| 2003/0118347 | A1 * | 6/2003 | Papaparaskeva et al. | 398/147 |
| 2003/0202749 | A1 * | 10/2003 | Madsen | 385/49 |
| 2004/0062552 | A1 * | 4/2004 | Moeller | 398/147 |

OTHER PUBLICATIONS

M. Shirasaki, "Chromatic-Dispersion Compensator Using Virtually Imaged Phased Array", *IEEE Photon. Tech. Lett.*, vol. 9, No. 12, Dec. 1997, pp. 1598-1600.
C. K. Madsen et al., "Optical All-Pass Filters For Phase Response Design With Applications For Dispersion Compensation", *IEEE Photon. Tech. Lett.*, vol. 10, No. 7, Jul. 1998, pp. 994-996.
L. F. Mollenauer et al., Wavelength Division Multiplexing With Solitons In Ultra-Long Distance Transmission Using Lumped Amplifiers, *Journal of Lightwave Technology*, vol. 9, No. 3, Mar. 1991, pp. 362-367.
G. Bellotti et al, "Cross-Phase Modulation Suppressor For Multispan Dispersion-Managed WDM Transmissions", *IEEE Photon. Tech. Lett.*, vol 12, No. 6, Jun. 2000, pp. 726-728.
G. Bellotti et al., "10×10 Gb/S Cross-Phase Modulation Suppressor For Multispan Transmissions Using WDM Narrow-Band Fiber Bragg Gratings", *IEEE Photon. Tech. Lett.*, vol. 12, No. 10, Oct. 2000, pp. 1403-1405.

(Continued)

*Primary Examiner*—M. R. Sedighian

(57) ABSTRACT

In one embodiment of the invention a dispersion compensator is provided for use in a dense wavelength division multiplexed optical communication system. The dispersion compensator comprises a periodic-group-delay dispersion compensation module which provides a portion of the dispersion compensation for a dispersion managed span of the optical communication system. A remaining portion of the dispersion compensation for the dispersion managed span is provided by dispersion compensating fiber. The portions of the dispersion compensation provided by each of the periodic-group-delay dispersion compensation module and the dispersion compensating fiber is selected such that the collision-induced timing jitter is reduced.

32 Claims, 9 Drawing Sheets

OTHER PUBLICATIONS

M. Eiselt, "Does Spectrally Periodic Dispersion Compensation Reduce Non-Linear Effects?", *ECOC'99*, Sep. 26-30, 1999, Nice, France, pp. I-144-I-145.

L. D. Garrett et al., Demonstration Of Virtually-Imaged Phased-Array Device For Tunable Dispersion Compensation in 16×10 Gb/s WDM Transmission Over 480km Standard Fiber, *Technical Digest of the Optical Fiber Communication Conference, OFC 2000*, pp. PD7-1/187-189, Mar. 2000.

F. Neddam et al., "Role of Intra and Interchannel Cross-Phase Modulation In Higher Order Fiber Dispersion Management", *IEEE Photon. Tech. Lett.*, vol. 12, No. 7, Jul. 2000, pp. 798-800.

H. Sugahara, "Role of Power Jitter Induced By Interchannel Interactions in Dispersion-Managed Lines", *Technical Digest of the Optical Fiber Communication Conference OFC 2001*, pp. MF8-1, Mar. 19-22, 2001.

P. V. Mamyshev et al., "Pulse-Overlapped Dispersion-Managed Data Transmission And Intrachannel Four-Wave Mixing", *Optics Letters*, vol. 24, No. 21, Nov. 1999, pp. 1454-1456.

P. V. Mamyshev et al., "Soliton Collisions In Wavelength-Division-Multiplexed Disperson-Managed Systems", *Optics Letters*, vol. 24, No. 7, Apr. 1999, pp. 448-450.

\* cited by examiner

DISPERSION COMPENSATION METHOD AND APPARATUS

TECHNICAL FIELD

The present invention relates to optical communications, and more particularly to dispersion compensation for high bit rate ultra-long haul (ULH) wavelength division multiplexed (WDM) optical communication systems using dispersion-managed solitons (DMS) or other transmission formats.

BACKGROUND OF THE INVENTION

DMS is a proven technology to extend the ultimate reach of high bit rate (e.g. 10 Gb/s) optical fiber communication systems by balancing the optical fiber's dispersion and nonlinearity. Dense WDM-DMS systems, however, tend to suffer one significant nonlinear penalty, i.e., a jitter in pulse arrival times resulting from the collisions between solitons of different channels.

When the dispersion compensation of a transmission span is accomplished with only dispersion-compensating fiber DCF, a pair of colliding pulses (from different channels) dart back and forth with respect to each other in retarded time, in a sawtooth motion typically several hundreds of picoseconds in amplitude (the dispersion of the span times the channel wavelength spacing). The net motion produced by each period of the sawtooth, governed by the path-average dispersion, is, however, quite small. Thus, before the colliding pulses finally separate, the pulses tend to interact with each other in a series of "mini-collisions", which in total comprise an overall collision that tends to be many thousands of kilometers long.

Since the repeated partial collisions that occur in the beginning stages of such an overall collision produce a steep staircase of frequency shift (from cross-phase modulation, or XPM), the net time shifts from such collisions are large (typically ~5 ps each when adjacent channels are involved). It is these large per-collision time shifts, compounded by the poor statistics of just a handful of collisions, that tend to create eye-closing timing jitter for distances in excess of about 5000 km.

Prior art attempts to reduce the XPM penalty include schemes for increasing the rate at which colliding pulses pass through each other. For example, one scheme attempts to introduce a one bit-period delay between adjacent channels in each 100 km span with a Mach-Zehnder fiber interferometer, or with a succession of fiber Bragg-gratings. Such attempts were able to claim a 2 dB reduction in the power penalty from XPM in relatively short ($\leq 500$ km) non-return-to-zero (NRZ) transmissions. The significant benefit of such attempts was strongly focused on the immediate neighborhood of a one-bit-period delay between two adjacent WDM channels.

Another scheme considered the use of periodic group delay (PGD) devices for reduction of XPM-induced penalties, where, for the optimal dispersion maps, there was almost no improvement from numerical simulations. An experiment performed with a different set of parameters showed an improvement of only ~0.85 dB.

The schemes discussed above were specifically used for NRZ transmission systems, without focusing on DMS systems that are intrinsically return-to-zero (RZ). The benefit of schemes using NRZ transmission stems from reduction of amplitude noise resulting from constructive interference between pulses from repeated mini-collisions. The benefit in a scheme using dispersion-managed solitons, however, stems from the reduction of XPM-induced frequency shifts and of the consequent timing jitter. The different nature of the penalties also results in the fact that whereas the XPM penalty in prior art schemes appears only with a non-optimized dispersion map, in a DMS scheme the XPM penalty tends to be inherent even with an optimized dispersion map for DMS.

Other prior art schemes for specifically reducing the collision-induced timing jitter in dense WDM-DMS systems includes frequency-guiding filters and jitter tolerant receivers, but these techniques are complex and not yet practical to implement in realistic systems. Accordingly, a need therefore exists for a method and apparatus to effectively reduce such collision-induced timing jitter and increase the transmission rate over optical WDM-DMS systems.

SUMMARY OF THE INVENTION

In accordance with one embodiment of the present invention, periodic-group-delay dispersion compensation modules (PGD-DCM's) are used to provide a portion of the dispersion-compensation in a dispersion managed span, which results in drastic reduction of the collision-induced timing jitter in dense WDM-DMS systems.

In another embodiment of the invention a dispersion compensator is provided for use in a dense wavelength division multiplexed optical communication system. The compensator comprises a periodic-group-delay dispersion compensation module which provides a portion of the dispersion compensation for a dispersion managed span of the optical communication system. A remaining portion of the dispersion compensation for the dispersion managed span is provided by dispersion compensating fiber. The portions of the dispersion compensation provided by each of the periodic-group-delay dispersion compensation module and the dispersion compensating fiber are selected such that the collision-induced timing jitter is reduced.

BRIEF DESCRIPTION OF THE DRAWINGS

The present invention will be more fully appreciated by consideration of the following detailed description, which should be read in light of the drawings in which:

FIGS. 5a1-f3 show simulated optical and electrical eye diagrams with all channels co-polarized, and with no ASE, for various amplification/Raman pumping conditions and for the values of f=0, 0.2 and 1;

DETAILED DESCRIPTION

Unless otherwise noted, or as may be evident from the context of their usage, any terms, abbreviations, acronyms or scientific symbols and notations used herein are to be given their ordinary meaning in the technical discipline to which the invention most nearly pertains. The following terms, abbreviations and acronyms are used in the description contained herein:

| | |
|---|---|
| ASK | amplitude shift keying |
| DCF | dispersion compensating fiber |
| DCM | dispersion compensation module |
| DMS | dispersion-managed soliton |
| DPSK | differential phase-shift keying |
| DQPSK | differential quadrature phase-shift keying |
| EDFA | Erbium-doped fiber amplifier |
| NRZ | non-return-to-zero |
| NZDSF | non-zero dispersion-shifted fiber |
| OOK | on-off keying |
| PGD | periodic-group-delay |
| RZ | return-to-zero |
| SPM | self phase modulation |
| ULH | ultra-long haul |
| WDM | wavelength division multiplexing (or multiplexed) |
| WGR | waveguide grating router |
| XPM | cross phase modulation |

Figure 1:
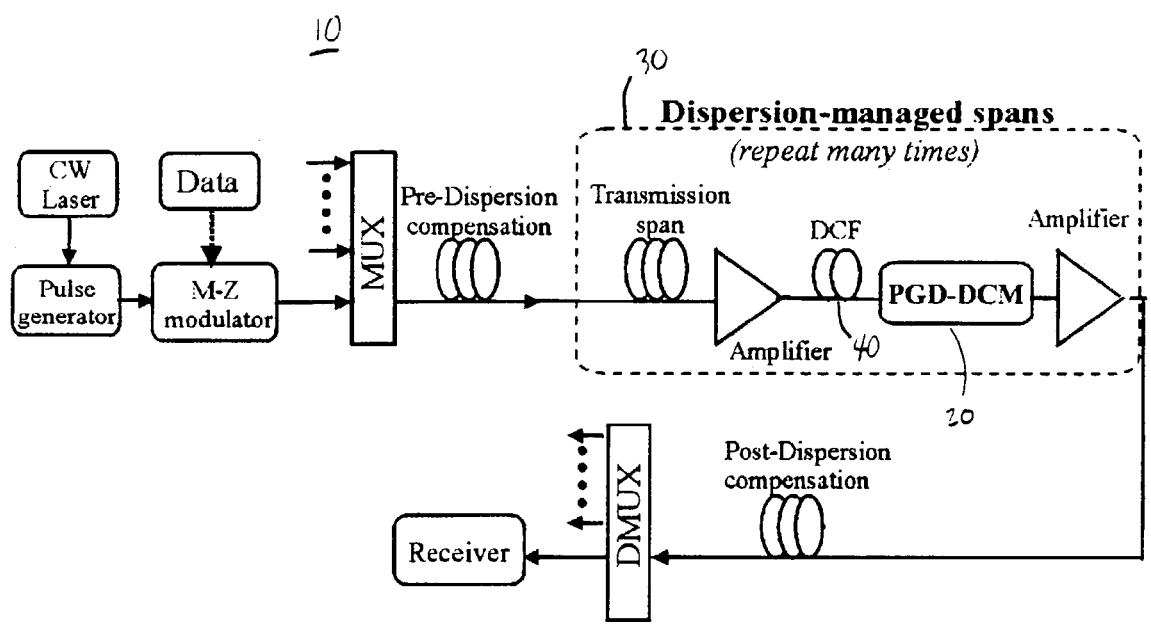
FIG. 1 is a schematic drawing of a WDM long haul transmission system using DMS and PGD-DCM's in accordance with one embodiment of the present invention.

A schematic diagram of a system 10 in accordance with one embodiment of the present invention is shown in FIG. 1. One or more periodic-group-delay dispersion compensation modules (PGD-DCM's) 20 are used to reduce the above-mentioned collision-induced timing jitter. A portion of the dispersion compensation for a dispersion-managed span 30, usually provided by a DCF, is provided by the PGD-DCM 20. The use of one or more PGD-DCM's 20 allows soliton pulses in different WDM channels to pass through each other more quickly and, therefore, reduces the soliton collision effect (i.e., timing jitter).

Figure 2:
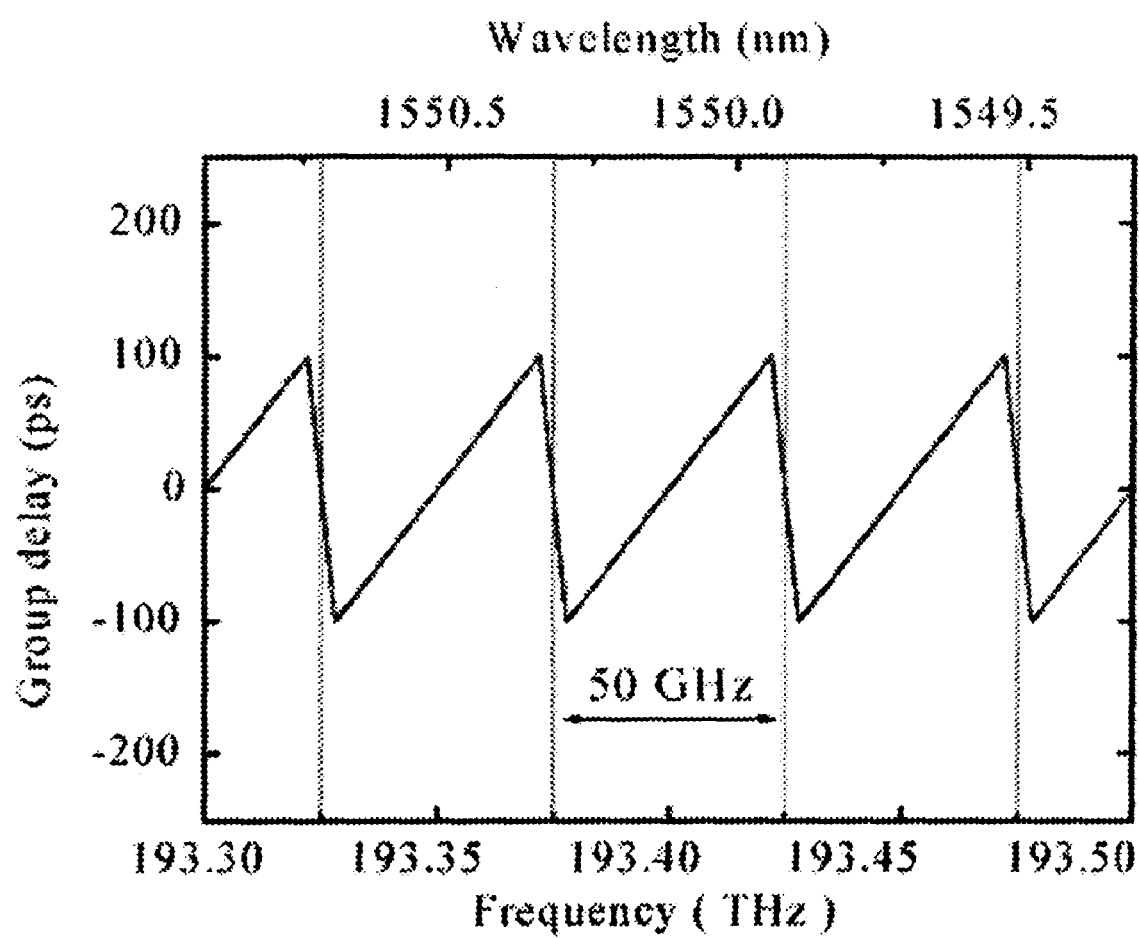
FIG. 2 is a plot showing the group delay of an idealized PGD-DCM designed for a channel spacing of 50 GHz.

As shown in FIG. 2, the group delays of PGD-DCM's are periodic with frequency. PGD-DCM's, unlike DCF, can compensate a certain amount of dispersion for each channel, without introducing an inter-channel group delay.

Several different versions of PGD-DCM's 20 can be used in accordance with the invention. These devices include phased arrays, such as the Virtual Imaged Phased Array (VIPA) (e.g. VIPA discussed in M. Shirasaki, "Chromatic-dispersion compensator using virtually imaged phased array", IEEE Phonics Technology Letters, vol. 9, pp. 1598-1600, 1997), waveguide grating routers (WGR) (e.g. WGR discussed in C. R. Doerr, et al, "Multichannel integrated tunable dispersion compensator employing a thermooptic lens", in Technical Digest of the Optical Fiber Communication Conference OFC '02, PD FA6-2, 2002), and all-pass filters based on either ring resonators (e.g. resonators discussed in C. K. Madsen and G. Lenz, "Optical all-pass filters for phase response design with applications for dispersion compensation", IEEE Photonics Technology Letters, vol. 10, pp. 994-996, 1998) or on Gires-Tournois reflective etalons (e.g. etalons discussed in D. J. Moss, et al, "Multichannel tunable dispersion compensation using all-pass multicavity etalons", in Technical Digest of the Optical Fiber Communication Conference OFC '02, pp. 132-133, 2002). More details of these PGD-DCM's are presented below. It will be appreciated by those skilled in the art that other PGD-DCM devices may be adapted for use in accordance with the present invention.

Figure 3:
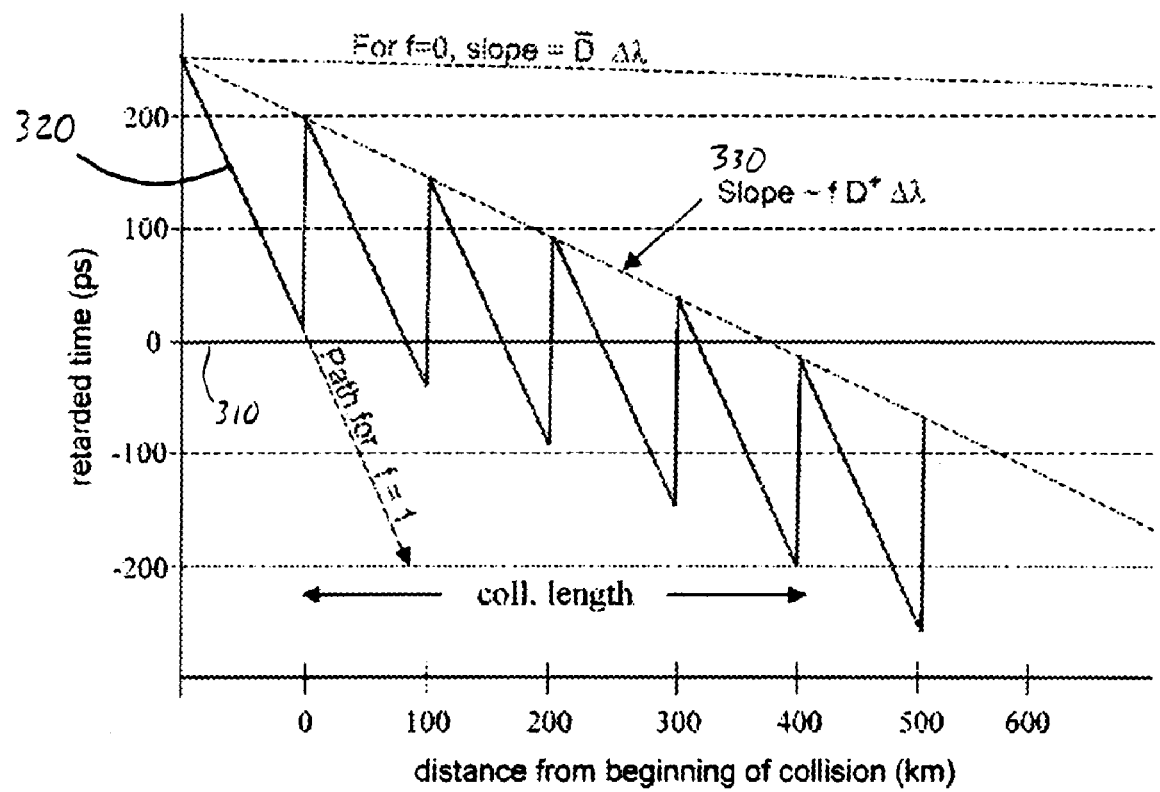
FIG. 3 is a plot showing relative motion in retarded time for a pair of colliding pulses from neighboring channels (spacing=50 GHz)

An analysis and numerical simulations showing the effectiveness of the present invention are presented below. The analysis begins with a study of the relative motion in retarded time of a pair of colliding pulses, for the general case where a fraction f of the span dispersion is compensated by the PGD-DCM device 20, while the remainder (1−f) is compensated by DCF 40. As seen in FIG. 3, a lower frequency pulse is at a reference frequency 310, and hence is fixed in retarded time. Thus, the motion of the higher frequency pulse 320 is also the relative motion of the two colliding pulses. The map of FIG. 3 consists of many spans of non-zero dispersion shifted fiber (NZDSF) having a span length $L^{30}$ =100 km, a dispersion of $D^+$=6 ps/nm-km, and a path-average dispersion of $\overline{D}$=0.15 ps/nm-km. For the particular behavior shown in FIG. 3 by the solid line 330, f=0.2

The different slopes of the dashed lines in FIG. 3 are the inverse of the average group velocities with which the pulses move with respect to each other, (for example, the slope 330 of the sawtooth plot of the higher frequency pulse 320), ranges from the very small value $\overline{D}\Delta\lambda$ at f=0 to the greater value of $D^+\Delta\lambda$ at f=1, where $\Delta\lambda$ is the channel spacing. For f=0.2, the slope has already increased by a large factor over the f=0 value.

FIG. 3 reveals that, at least when f is not too close to 1, the collision length, $L_{coll}$ (the distance the pair of colliding pulses must travel together between the time they first begin to interact until they finally separate) is approximately given by the recovery time provided by the DCF divided by the slope of the sawtooth plot 330.

Thus, we have:

$$L_{coll} \cong \frac{(1-f)D^+L^+\Delta\lambda}{(fD^+ + \overline{D})\Delta\lambda} = \frac{1-f}{f + \overline{D}/D^+}L^+. \quad (1a)$$

In order to have an expression that is valid in the region of f≈1, however, it is necessary to take the finite pulsewidth τ into account. In that case, $L_{coll}$ is given more exactly by $$L_{coll} = \frac{2\tau + \tau_{eff}}{\overline{D}_{inter}\Delta\lambda}, \quad (1b)$$

where $$\tau_{eff} = (1-f)(D^+ - \overline{D})L^+\Delta\lambda \quad (2)$$

is an effective pulse width provided by the recovery time in the DCF, and where $$\overline{D}_{inter} = f(D^+ - \overline{D}) + \overline{D} \quad (3)$$

is the "inter-channel" $\overline{D}$ associated with the slope of the sawtooth of FIG. 3.

Figure 4:
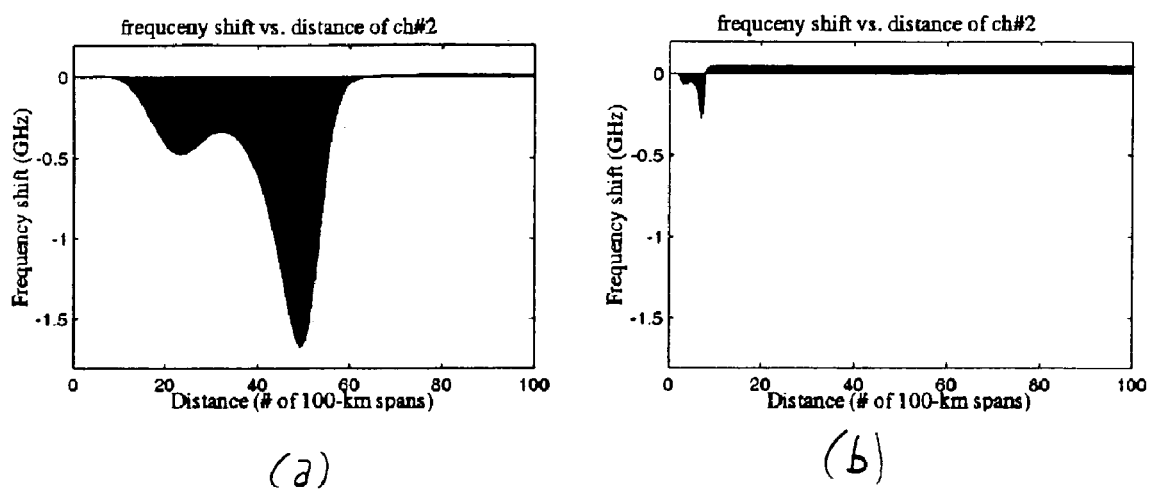
FIGS. 4a-b are plots showing frequency shifts of the lower-frequency pulse of two colliding pulses from adjacent channels in the system of FIG. 1 with f=0 (a) and f=0.2 (b)

The rapid decline in $L_{coll}$ as f is increased from zero (Eqn. 1) has significant effects, as can be clearly seen from the curves of collision-induced frequency shifts shown in FIG. 4. For both f=0 and f=0.2, the frequency shifts ultimately return to zero. An important feature of these "frequency-conserving" collisions is the significant reduction in all measures of the collision size as f goes from 0 to 0.2. In accord with the prediction of Eqn. 1b, $L_{coll}$ is reduced by a factor of ~10, and the peak frequency shift is reduced by a similar factor. The time shift induced by each collision scales almost as rapidly as $L_{coll}^2$ when f increases (and $L_{coll}$ decreases) throughout the region of frequency-conserving collisions. As $L_{coll}$ decreases, the number of consecutive collisions experienced by a pulse may increase, therefore the reduction of total timing jitter does not scale as rapidly as $L_{coll}^2$. Nevertheless, the timing jitter reduction is still significant.

As f becomes significantly greater than about 0.2 (for example, f>0.6, so that $L_{coll}$ ceases to be at least several span lengths long), the collisions are in general no longer frequency-conserving. The effect is preferably avoided by having f less than about 0.6, otherwise, the residual frequency shifts, when compounded with the dispersion remaining to the end of the transmission, can once again produce large time shifts. Accordingly, $L_{coll}$ is preferably kept at least several span lengths long by choosing a relatively small value of f (e.g. about 0.2).

Since many PGD-DCM devices have a finite "group delay ripple" with respect to frequency or wavelength, which can accumulate when the PGD-DCM's are used repeatedly in a multi-span system, a smaller f of less than about 0.6 is preferred and can relax the requirement on the group delay ripple specification of the PGD-DCM devices.

It should be noted that the above analysis is presented as an example system with particular characteristics such as the local dispersion $D^+$, the path-average dispersion $\overline{D}$, the power evolution of the optical pulses, the WDM channel spacing $\Delta\lambda$, etc. For a different transmission system with another set of parameters, the optimal value of f may vary although the underline principles of the effect remain the same.

Figure 5:
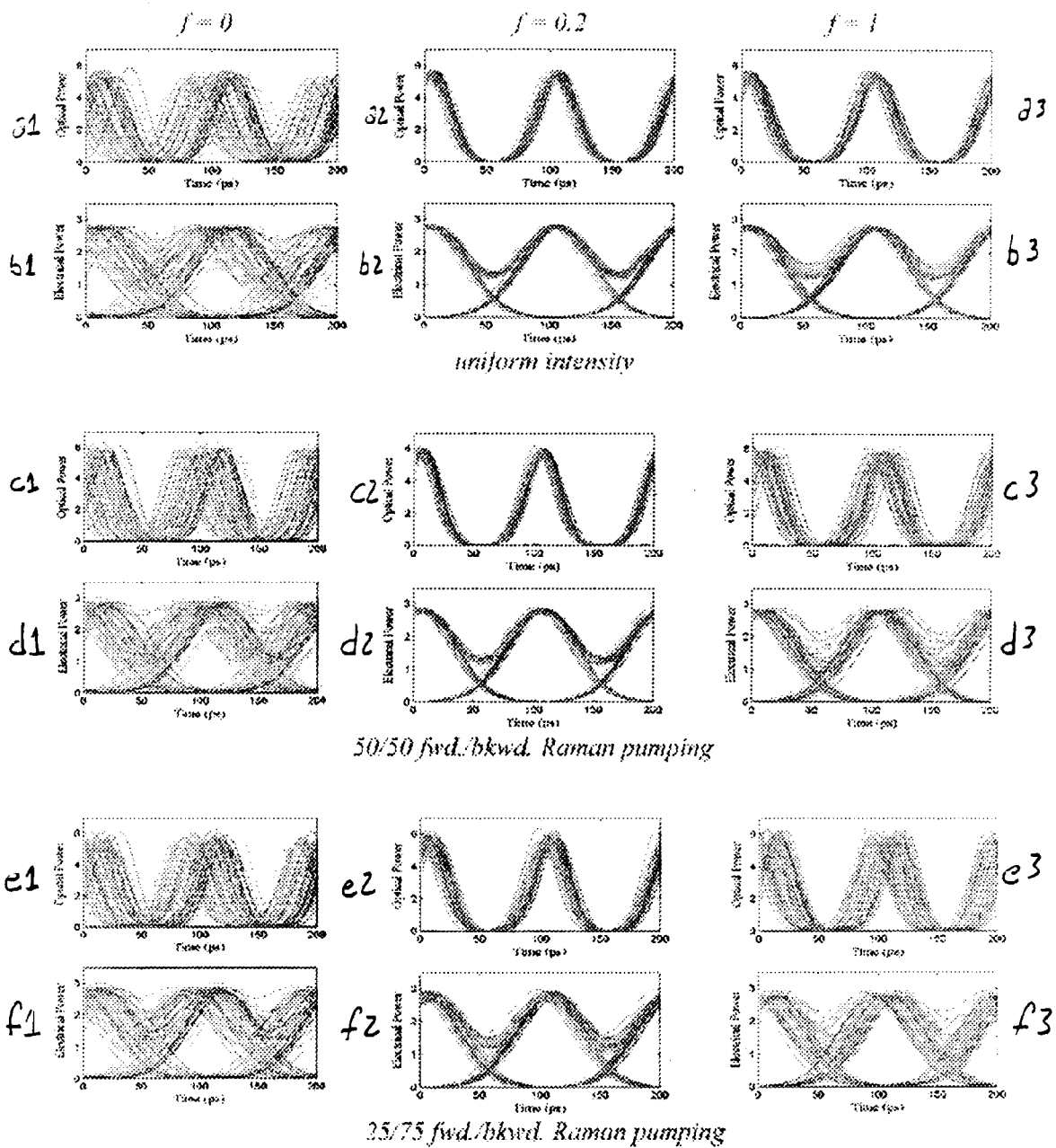

The results of a numerical simulation to test the jitter reduction effect of using PGD-DCMs in dense WDM systems explained above, are presented below. The numerical simulations have been performed for either 80 or 100 km spans of fiber with $D^+$=6 ps/nm-km, with the dispersion compensated for with various combinations of DCF and PGD-DCMs. The path-average pulse energies were maintained at the level (W=22 fJ) required to maintain dispersion-managed solitons with an unchirped pulse width of $\tau$=33 ps. The adjacent channel spacing was 50 GHz, the simulations involved between 5 and 8 channels, and each channel had its own independent 128-bit-long random pattern. It is known that numerical simulations of dense WDM with a few channels tend to yield results that are nearly indistinguishable from the effects of a very large number of channels. In order to see just the nonlinear effects, no ASE was introduced into the simulations. FIGS. 5a1-f3 show a representative set of eye diagrams (after 8000 km) from the simulations.

As is immediately obvious from FIGS. 5a1-f3, the quality of the eye patterns change dramatically as f is varied. Note in particular that while the eye patterns are more or less uniformly poor at f=0 (100% compensation by DCF), independently of the Raman pumping conditions, they are excellent at about f=0.2 for the cases of uniform intensity and 50/50 forward/backward Raman pumping, and still very good for the case of 25/75 forward/backward Raman pumping. The improvement here over the behavior for f=0 corresponds to the predictions of scaling discussed above. Finally, as can be seen from FIGS. 5a3-f3 (rightmost column of subfigures, where f=1 for 100% compensation by the PGD-DCM), the eye pattern is still excellent for the case of uniform intensity, however, it becomes progressively worse with 50/50 and 25/75 Raman pumping.

From simulations with other values of f, it has been observed that the timing jitter tends to remain very small over a wide range of values of f. The position of a minimum timing jitter depends somewhat on the profile of intensity over the spans. The tolerance for considerable variation in f is important, as it provides room to use the PGD-DCMs for complete correction of both slope and curvature of the span dispersion. Etalon-based PGD-DCMs are particularly amenable to making such sophisticated corrections of the dispersion.

Although the above analysis was done by assuming that the PGD-DCM's are used in every transmission span, the PGD-DCM's according to the invention may be used every other span, or every few spans, or in various combinations thereof.

Figure 6A:
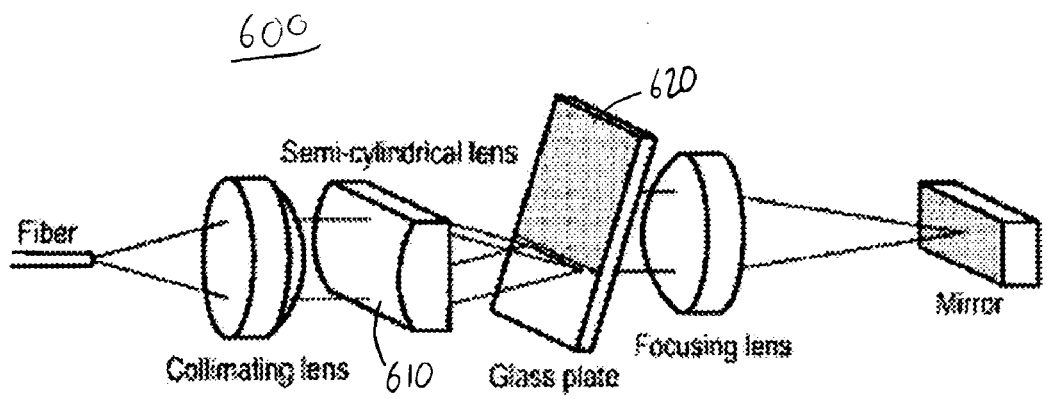
FIGS. 6a-b are schematic drawings of a PGD-DCM based on a virtually-imaged phased-array.
Figure 6B:
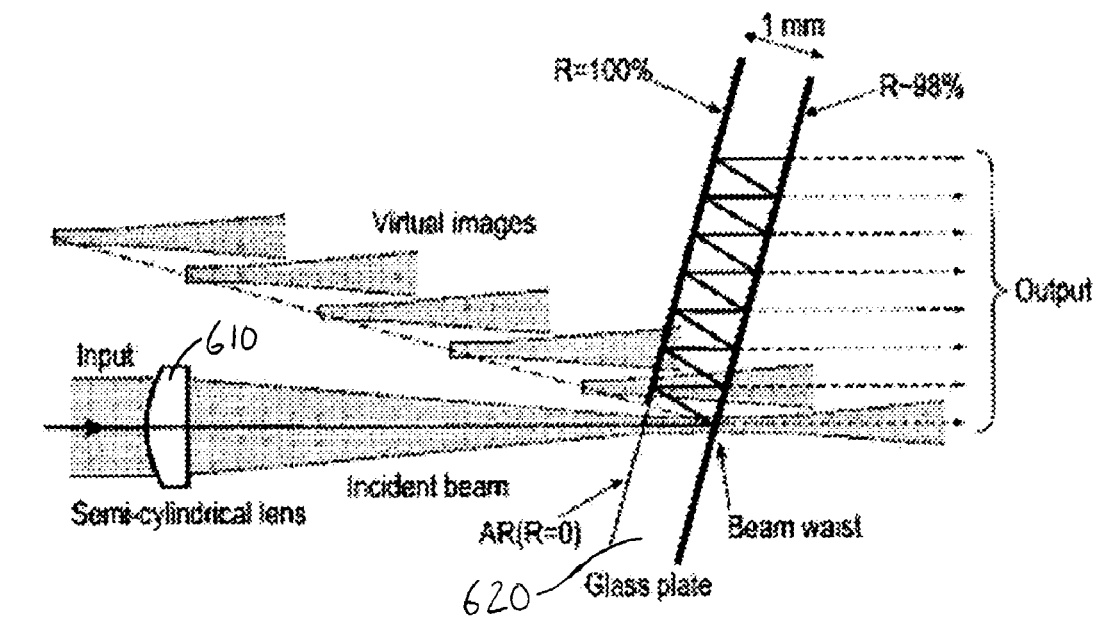

Different types of PGD-DCM's for use with the invention are discussed below. FIGS. 6a and 6b are schematic drawing of a VIPA 600. The key components in a VIPA are a semi-cylindrical lens 610 and a glass plate 620 having coatings on both sides.

The dimensions shown in FIG. 6b are typical values for a VIPA and may vary depending on the design and application. It has been shown in the literature that VIPA can provide large chromatic dispersion for individual WDM channels but does not introduce large group velocity delays between the channels, which is an important feature of PGD-DCM.

Figure 7:
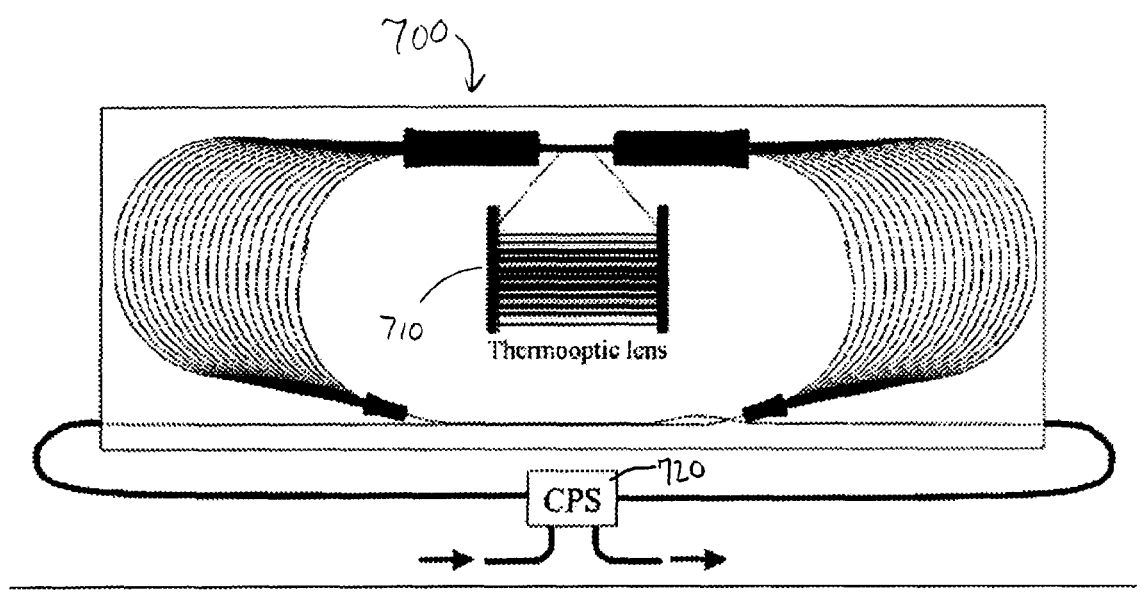
FIG. 7 is a diagram showing a waveguide grating router-based PGD-DCM.

FIG. 7 shows a WGR-based PGD-DCM 700, which can be fabricated on a silicon wafer using the silicon optical bench technology. The thermooptic lens 710 adds tuning capability to the PGD-DCM 700 and is optional. The CPS 720 is a circulator/polarization splitter.

Figure 8:
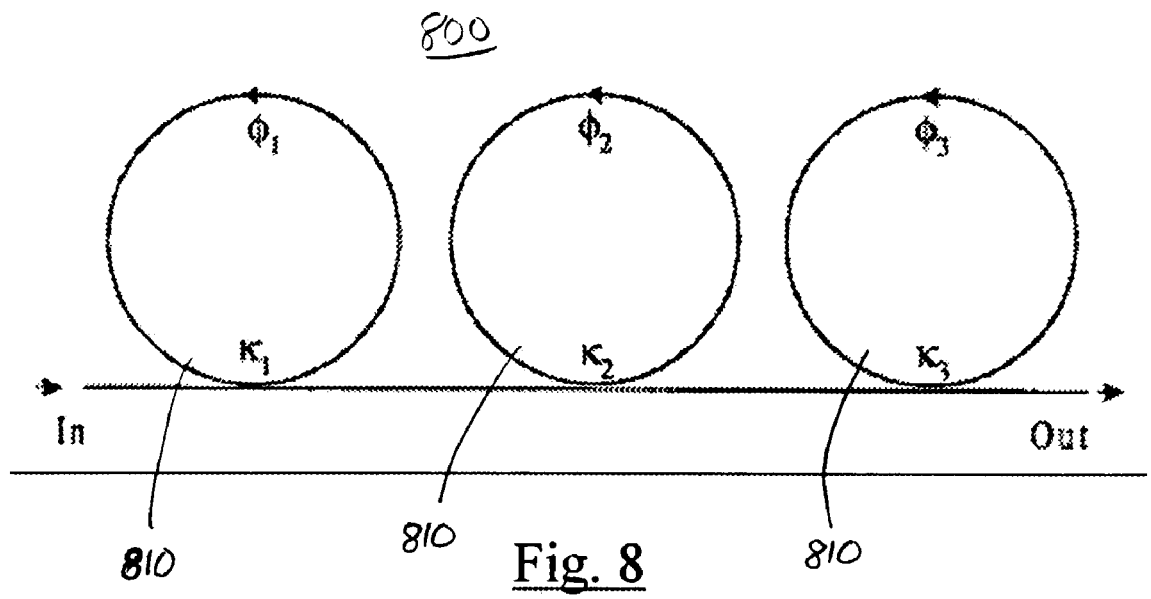
FIG. 8 is a schematic drawing of cascaded ring resonator all-pass filters.
Figure 9:
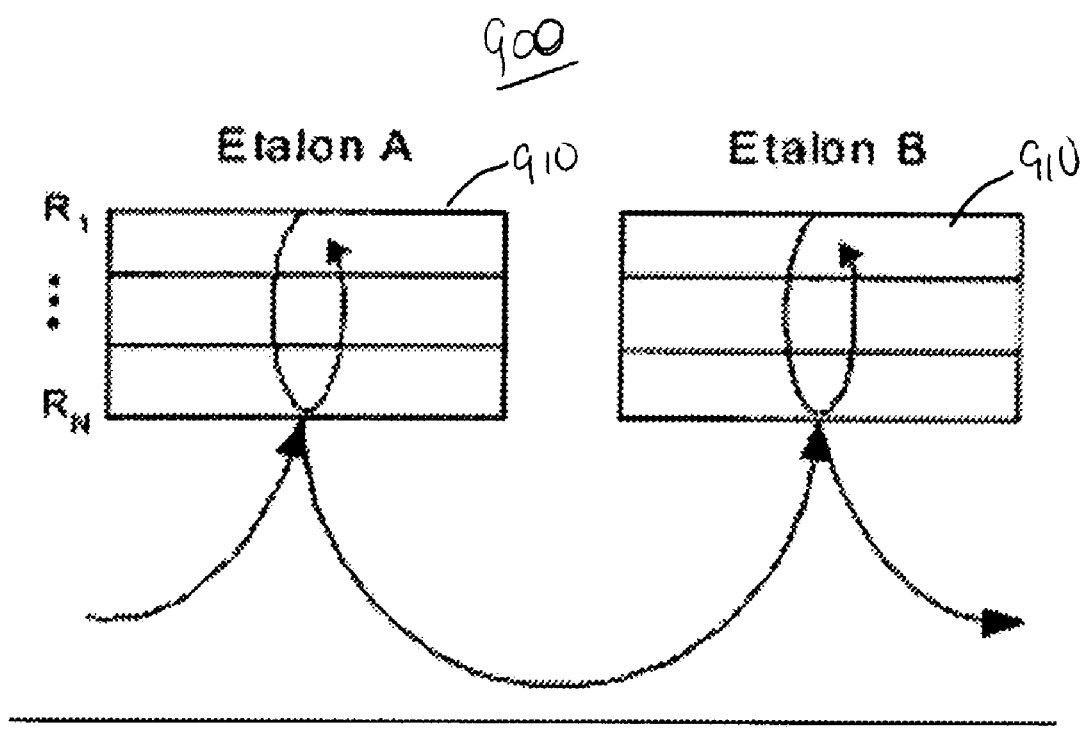
FIG. 9 is a schematic drawing of cascaded reflective etalon all-pass filters.

FIG. 8 is a schematic drawing of an all-pass filter 800 based on cascaded ring resonators 810. When designed properly, the ring resonator all-pass filter can serve as a PGD-DCM with sufficiently large passband and small group delay ripple. For simplicity only three rings are shown in FIG. 8, whereas in a real device many more rings can be used. $\phi_n$ and $\kappa_n$ shown in FIG. 8 are the phase shift and power coupling ratio, respectively;

FIG. 9 is a schematic drawing of another all-pass filter based on cascaded reflective etalons 910. The operation principles of the etalons 910 are very similar to those of the ring resonators 810 and can also be used as PGD-DCM's. Likewise, a much larger number of etalons can be used in a real device than shown in FIG. 9.

It will be appreciated by those skilled in the art that the method and apparatus of the invention can be applied to systems using various optical amplification schemes, for example, all-Raman, Raman/erbium-dope fiber amplifier (EDFA) hybrid, and EDFA only systems. Return-to-zero on-off keying (RZ-OOK) or return-to-zero differential phase shift keying (RZ-DPSK) signaling formats may be employed in systems according to the invention. The system and method of the invention can also be used for more general soliton-like RZ transmissions.

In view of the foregoing, one embodiment of the apparatus of the invention is a dispersion compensator for use in dense wavelength division multiplexed optical communication systems comprising a periodic-group-delay dispersion compensation module adapted to provide at least a portion of the dispersion compensation for at least one dispersion managed span of an optical communication system. Dispersion compensating fiber is used to provide a remaining portion of the dispersion compensation for the dispersion managed span. The portions of the dispersion compensation provided by the periodic-group-delay dispersion compensation module and the dispersion compensating fiber are selected such that the collision-induced-timing jitter is reduced.

Preferably, the periodic-group-delay dispersion compensation module provides between about 1-60% of the dispersion compensation for a dispersion managed span of the optical communication system. More preferably, the periodic-group-delay dispersion compensation module provides about 20% of the dispersion compensation for a dispersion managed span if the span local dispersion $D^+$ is about 6 ps/nm-km (a typical value of NZDSF).

The optical communication system can employ a return-to-zero on-off keying modulation format or a return-to-zero differential phase shift keying modulation format.

Optical communication systems in accordance with the invention support dispersion-managed solitons with a span length of between about 30 km and about 130 km and a path-average dispersion value of between about −0.2 ps/nm-km and 0.5 ps/nm-km. The optical communication system also preferably supports 10 Gb/s per channel with a channel spacing of about 50 GHz.

Preferably, the portions of the dispersion compensation provided by each of the periodic-group-delay dispersion compensation module and the dispersion compensation fiber are selected such that the collision length is reduced without significantly increasing the residual frequency shift and resultant timing jitter.

In another preferred embodiment of the invention, the portions of the dispersion compensation provided by each periodic-group-delay dispersion compensation module and dispersion compensating fiber are selected such that the collision length of colliding pulses transmitted through the optical communication system is at least about two times the length of a dispersion managed span.

In another preferred embodiment of the dispersion compensator of the invention, the portions of the dispersion compensation provided by each of the periodic-group-delay dispersion compensation module and the dispersion compensating fiber are optimized to reduced resultant overall timing jitter of the optical communication system based on operating parameters of the dispersion managed span. The operating parameters may include the local dispersion of the dispersion managed span, path-average dispersion of the dispersion managed span, the profile of the power evolution of the optical pulses along the transmission, and any other parameters of the optical communication system.

In another embodiment of the invention, an optical communication system is provided comprising one or more periodic-group-delay compensation modules adapted to provide a portion of the dispersion compensation for one or more dispersion managed spans of the optical communication system. The remaining portion of the dispersion compensation for one or more of the dispersion managed spans is provided by one or more dispersion compensating fibers. The one or more periodic-group-delay dispersion compensation modules may be employed over a plurality of spans of the optical communication system. The optical communication system further comprises optical amplifiers which are all-Raman amplifiers, Raman/erbium-doped fiber amplifier hybrid amplifiers, EDFA amplifiers, or the like. The optical communication system may employ a return-to-zero on-off keying modulation format or a return-to-zero differential phase shift keying modulation format.

In one embodiment of a method of providing dispersion compensation according to the invention, a periodic-group-delay compensator is provided which is adapted to provide a portion of the dispersion compensation for one dispersion managed span of an optical communication system. Dispersion compensating fiber is also provided to provide a remaining portion of the dispersion compensation for at least one dispersion managed span. Portions of the dispersion compensation provided by each of the periodic-group-delay dispersion compensation module and dispersion compensating fiber are selected such that the collision-induced timing jitter is reduced.

Although the present invention has been described in accordance with the embodiments shown, one skilled in the art will readily recognize that there could be variations to the embodiments and that those variations would be within the spirit and scope of the present invention. For example, although some of the embodiments disclosed herein have been described with reference to DMS-OOK signal/modulation formats, other signal formats, such as NRZ and RZ, and other modulation formats, such as ASK, PSK, DPSK and DQPSK, may be employed with the apparatus and method of the invention. Accordingly, many modifications may be made by one skilled in the art without departing from the spirit and scope of the appended claims.

The invention claimed is:

1. An optical communication system, comprising:
    a dispersion-managed span including:
        a span of dispersive optical fiber capable of causing a dispersion of an optical signal propagating therethrough;
        a length of dispersion-compensating fiber optically coupled to said dispersive fiber; and
        a periodic-group-delay dispersion compensating module optically coupled to said dispersion-compensating fiber,
    wherein said system is configured to transmit solitons at a lower optical frequency associated with a first channel and solitons at a higher optical frequency associated with a second channel, and wherein said dispersion-compensating fiber and said module are configured to cause a soliton pulse associated with said first channel and a soliton pulse associated with said second channel to interact over a distance at least about twice a length of said dispersion-managed span.

2. The optical communication system recited in claim 1 wherein said module includes a Gires-Tournois reflective etalon filter.

3. The optical communication system recited in claim 1 wherein said module includes an all-pass ring resonator filter.

4. The optical communication system recited in claim 1 wherein said module includes a virtually imaged phased array.

5. The optical communication system recited in claim 1 wherein said module includes a waveguide grating router.

6. The optical communication system recited in claim 1, further comprising an optical signal source configured to modulate said optical signal with digital data using a modulation scheme selected from the group consisting of:
    return-to-zero format;
    non-return-to-zero format;
    dispersion-managed soliton format;
    amplitude-shift keying modulation format;
    phase-shift keying modulation format;
    differential phase-shift keying modulation format; and
    differential quadrature phase-shift keying modulation format.

7. The optical communication system recited in claim 1, wherein said optical signal comprises optical data with 10 Gb/s per channel data transmission rate and a channel spacing of about 50 GHz.

8. The optical communication system recited in claim 1, wherein said optical signal is propagated through a plurality of said dispersion-managed spans.

9. The optical communication system recited in claim 8, wherein said module is configured to provide a fraction of a total dispersion reduction provided by said dispersion-managed span ranging from about 1% to about 60%.

10. The optical communication system recited in claim 8, wherein said module is configured to provide about 20% of a total dispersion reduction provided by said dispersion-managed span.

11. The optical communication system recited in claim 8, wherein said dispersion-managed span further comprises an optical amplifier configured to amplify said optical signal.

12. The optical communication system recited in claim 11, wherein said optical amplifier is configured to amplify said optical signal at an input to said dispersion-managed span and a second optical amplifier is configured to amplify said optical signal at an output from said dispersion-managed span.

13. The optical communication system recited in claim 11, wherein said optical amplifier is selected from the group consisting of:
    an all-Raman amplifier;
    a Raman/Erbium-doped fiber amplifier hybrid amplifier; and
    an EDFA amplifier.

14. The optical communication system recited in claim 8, wherein a length of said dispersion-managed span ranges from about 30 km to about 130 km.

15. The optical communication system recited in claim 8, wherein a path-average dispersion value of said dispersion-managed span ranges from about −0.2 ps/nm-km to about 0.5 ps/nm-km.

16. The optical communication system recited in claim 1, further comprising an optical signal source configured to provide said solitons at a lower optical frequency and said solitons at a higher optical frequency.

17. A method of transmitting an optical signal, comprising:
    configuring said optical signal to include soliton pulses at a lower frequency associated with a first channel and soliton pulses at a higher frequency associated with a second channel;
    transmitting said optical signal in a dispersion-managed span including:
        a dispersive optical fiber causing dispersion of said optical signal;
        a periodic-group-delay dispersion compensating module that reduces said dispersion by a first fraction of a total reduction; and
        a dispersion compensating fiber that reduces said dispersion by a remaining fraction of said total reduction,
    thereby causing a soliton pulse associated with said first channel and a soliton pulse associated with said second channel to interact over a distance at least about twice a length of said dispersion-managed span.

18. The method recited in claim 17, wherein said module includes a Gires-Tournois reflective etalon filter.

19. The method recited in claim 17, wherein said module includes an all-pass ring resonator filter.

20. Presented) The method recited in claim 17, wherein said module includes a virtually imaged phased array.

21. The method recited in claim 17, wherein said module includes a waveguide grating router.

22. The method recited in claim 17, further comprising configuring an optical signal source to modulate an optical signal with digital data using a modulation scheme selected from the group consisting of:
    return-to-zero format;
    non-return-to-zero format;
    dispersion-managed soliton format;
    amplitude-shift keying modulation format;
    phase-shift keying modulation format;
    differential phase-shift keying modulation format; and
    differential quadrature phase-shift keying modulation format.

23. The method recited in claim 17, wherein said optical signal comprises optical data with 10 Gb/s per channel data transmission rate and a channel spacing of about 50 GHz.

24. The method recited in claim 17, wherein said optical signal is propagated through a plurality of said dispersion-managed spans.

25. The method recited in claim 24, wherein said module is configured to provide a fraction of said total dispersion reduction provided by said dispersion-managed span ranging from about 1% to about 60%.

26. The method recited in claim 24, wherein said module is configured to provide about 20% of a total dispersion reduction provided by said dispersion-managed span.

27. The method recited in claim 24, wherein optical signal is amplified in said dispersion-managed span.

28. The method recited in claim 27, wherein said optical signal is amplified prior to compensating for said first fraction and after said compensating for said remaining fraction.

29. The method recited in claim 27, wherein said amplification is provided by an amplifier selected from the group consisting of:
    an all-Raman amplifier;
    a Raman/Erbium-doped fiber amplifier hybrid amplifiers; and
    an EDFA amplifier.

30. The method recited in claim 24, wherein a length of said dispersion-managed span ranges from about 30 km to about 130 km.

31. The method recited in claim 24, wherein a path-average dispersion value of said dispersion-managed span ranges from about −0.2 ps/nm-km to about 0.5 ps/nm-km.

32. The method recited in claim 17, further comprising configuring an optical signal source to provide said solitons at said lower optical frequency and said solitons at said higher optical frequency.

* * * * *